United States Patent [19]

Semence

[11] Patent Number: 5,275,375
[45] Date of Patent: Jan. 4, 1994

[54] ROTARY THROTTLE MEMBER AND A THROTTLE BODY FOR AN INTERNAL COMBUSTION ENGINE

[75] Inventor: Pierre Semence, Chatou, France

[73] Assignee: Solex, France

[21] Appl. No.: 70,244

[22] Filed: Jun. 2, 1993

[30] Foreign Application Priority Data

Jun. 17, 1992 [FR] France ............... 92 07351

[51] Int. Cl.⁵ ................................ F16K 1/22
[52] U.S. Cl. ...................... 251/308; 251/263; 123/400
[58] Field of Search ............ 251/263, 305, 308, 313; 123/400

[56] References Cited

U.S. PATENT DOCUMENTS

| | | | |
|---|---|---|---|
| 2,529,572 | 11/1950 | Raybould | 251/308 |
| 4,109,837 | 8/1978 | Taylor | 251/308 X |
| 5,216,992 | 6/1993 | Ropertz | 251/305 X |

FOREIGN PATENT DOCUMENTS

| | | |
|---|---|---|
| 0113875 | 7/1984 | European Pat. Off. . |
| 2615041 | 10/1977 | Fed. Rep. of Germany . |
| 9108326 | 10/1991 | Fed. Rep. of Germany . |
| WO91/13245 | 9/1991 | PCT Int'l Appl. . |
| 1061651 | 6/1964 | United Kingdom . |

*Primary Examiner*—John C. Fox
*Attorney, Agent, or Firm*—Larson and Taylor

[57] ABSTRACT

A rotary throttle member for an internal combustion engine comprises a shaft and a butterfly valve member secured to a central length of the shaft. The shaft and butterfly valve member are single pieces of synthetic material. End portions of the shaft straddle the said central length. The central length has a uniform non-circular cross-section greater than that of the full end portion of the shaft situated on one side of the length. The shaft includes a cam for connection with and winding of a control cable, situated on the other end portion of the shaft. The butterfly valve member has a central hole of complementary cross-section of said central length and is fixed onto the central length.

8 Claims, 2 Drawing Sheets

ROTARY THROTTLE MEMBER AND A THROTTLE BODY FOR AN INTERNAL COMBUSTION ENGINE

BACKGROUND OF THE INVENTION

The present invention relates to a rotary throttle member for a fuel admission system of an internal combustion engine, the throttle member being of the type comprising a shaft having cylindrical bearing surfaces straddling a section for receiving a butterfly valve member. An application that is particularly important, but not exclusive, lies in throttle body assemblies for fuel injection systems.

Conventionally, a rotary throttle member for an admission system consists of a shaft and a butterfly in the form of a flat disk, both being made of metal. The butterfly is held in a slot or on a flat of the shaft by means of screws. The manufacture of such a member by machining and assembling is expensive.

In addition, experience has shown that under unfavorable atmospheric conditions frost is prone to attach to the metal parts and in particular to the connection zones between the butterfly and the shaft.

SUMMARY OF THE INVENTION

It is a general object of the invention to provide an improved rotary throttle member of the above-defined type. It is a more specific object to reduce the cost of machining and assembly. To this end, the invention provides a rotary throttle member wherein said section or length has a uniform non-circular cross-section that is greater than the cross-section of the entire portion of the shaft situated on one side of the length; the shaft is molded out of synthetic material, generally a thermoplastic material, in the form of a single piece including a cam for connection with and winding of a control cable, said cam being situated on the other side of the length, and the butterfly is also made of synthetic material, generally thermo-plastic material, and has a central hole of complementary cross-section to that of said length and is threaded on and fixed to said length. The cam may constitute a pulley on which the control cable is wound over an adjustable length.

The present molding methods allow the components of the throttle member to be made with a surface state that is good enough for removing any need for subsequent machining. Assembling can be performed very simply, merely by engaging the shaft through a housing for receiving it and through the butterfly which has previously been located in the housing. The butterfly can then be fixed to the shaft by a simple operation, generally ultrasound welding, while the butterfly is closed, i.e. while the butterfly is exactly centered in the passage that receives it.

The synthetic material used should be of a type that withstands corrosion from the various fuels in use: to facilitate manufacture, a low-shrinkage thermo-plastic material will generally be used. The thermo-plastic material may preferably contain a fill, generally of glass fiber, at a concentration that will often be in the range 30% to 40% by weight, thereby imparting stiffness to the throttle member enabling it to avoid being deformed in operation.

Suitable thermo-plastic materials include, non-exclusively, various polyetherimides and polyphenylene sulfones. These materials have the additional advantageous characteristic of poor frost adherence, thus reducing the risk of a break-down due to the flow cross-sectional area being reduced or shut off by frost, or due to jamming of the control.

It is also known that the housing of a butterfly valve for an engine admission can be made of plastic directly in its final state since such a housing has a much smaller number of ducts than does a carburettor, thereby making molding possible using a mold of acceptable complexity. The invention also provides a throttle body including a rotary throttle member of the above type and a housing of synthetic material, generally thermoplastic, of the same nature or at least having the same characteristics as the rotary member (in particular with respect to thermal expansion coefficient and resistance to corrosion by fuel). The throttle body can thus be made at a cost which is considerably less than that of throttle bodies presently in use.

The invention will be better understood from the following description of a particular embodiment given by way of non-limiting example. The description refers to the accompanying drawings.

DETAILED DESCRIPTION

There follows a description of a rotary throttle member as applied to a throttle body, the housing and the throttle member of the body both being made of filled thermo-plastic material. However, this application is not limiting and, in particular, it is possible to use a rotary member of the invention in a throttle body or a carburettor having a housing conventionally made by machining a metal casting.

Figure 1:
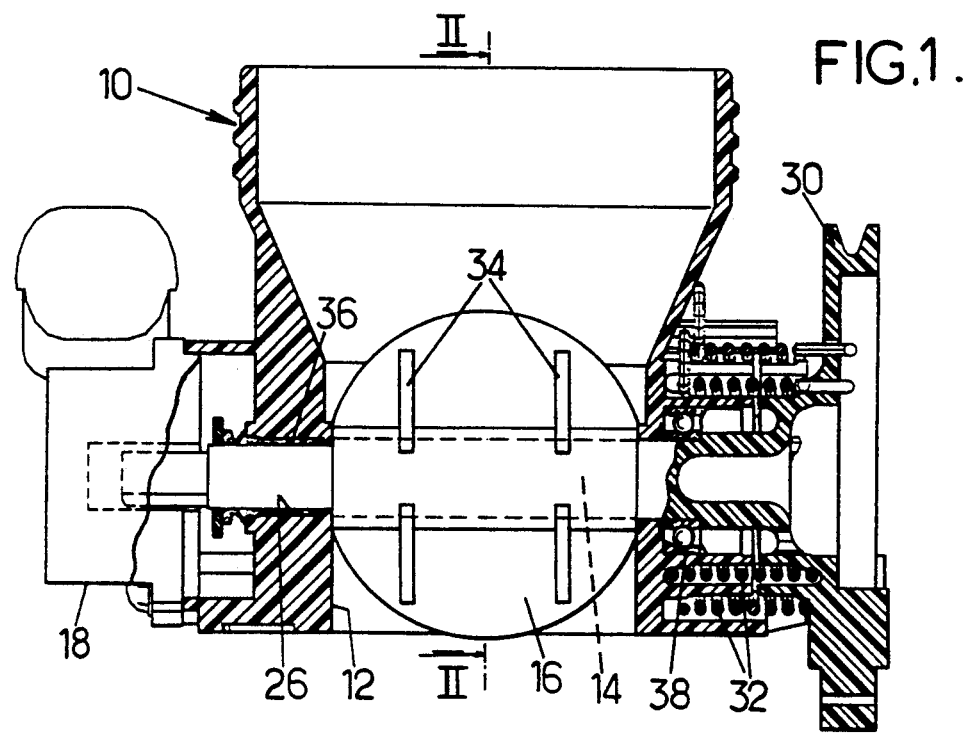
FIG. 1 shows the essential components of a throttle body constituting a particular embodiment of the invention, shown in cross-section along a plane including the axis of the induction passage and the axis of the rotary member.
Figure 2:
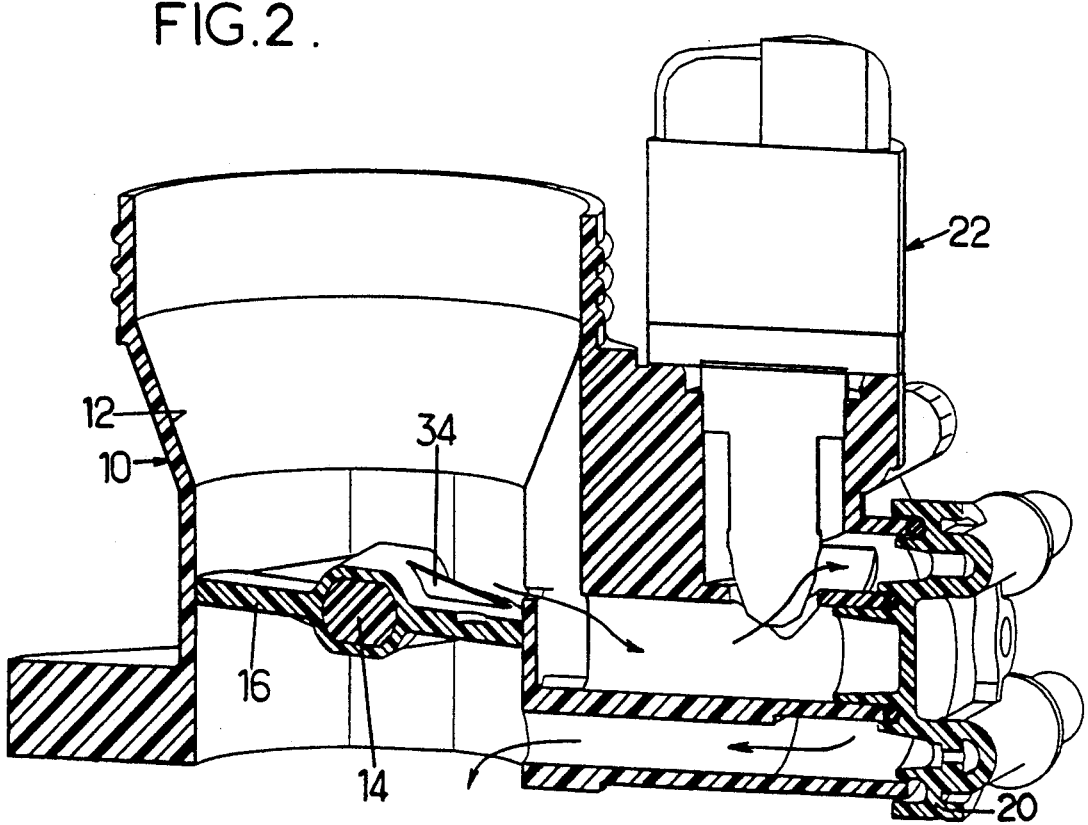
FIG. 2 is a view partially in perspective and partially in cross-section along line II—II of FIG. 1.

The throttle body whose main components are shown in FIGS. 1 and 2 is generally comparable in structure to that described in French patent application No. 9105512 filed 6 May 1991, to which reference may be made. The throttle body comprises a housing 10 defining an induction passage 12. The rotary member passes through the passage and may be thought of as comprising a shaft 14 having a butterfly 16 fixed thereon. The shaft 14 is connected to the slider of a potentiometer 18 for providing an electrical signal representative of the angular position of the butterfly to an injection control circuit (not shown). On molding, ducts for conveying air from upstream to downstream are formed in the housing for feeding the engine when the butterfly 16 is closed. A cap 20 separates the ducts from the outside. Air flow is controlled by a valve 22 (e.g. stepper motor valve, proportioning valve, expandable element) fixed on the housing 10.

Figure 4:
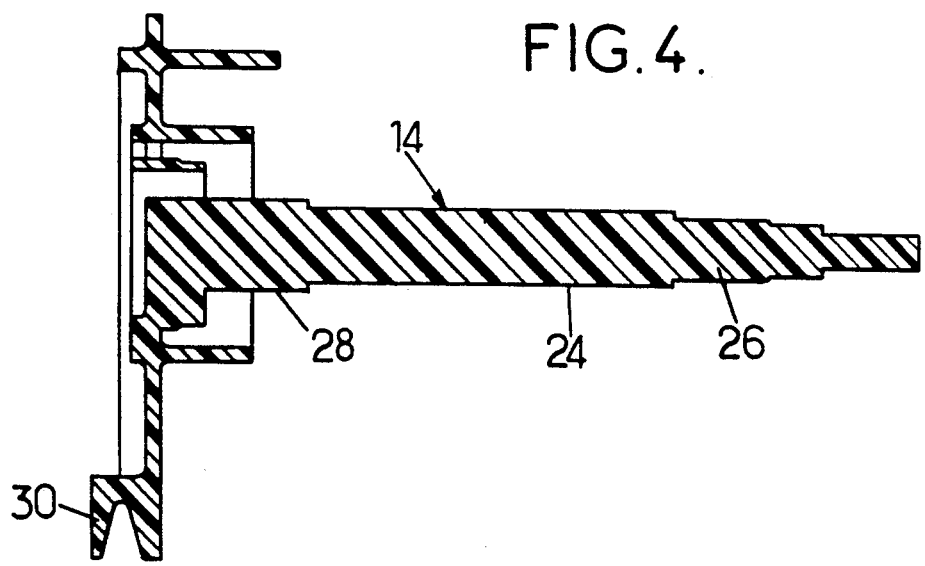
FIG. 4 shows the shaft of the member of FIG. 3, in cross-section on line IV—IV.

The shaft 14 of the throttle member as shown in FIGS. 1, 2 and 4 is constituted by a single piece of loaded thermo-plastic material which is molded directly into its final state. It may be considered as comprising a rod and a terminal cam for securing and winding a control cable. In the embodiment shown, the cam also constitutes a point to which a return spring is fastened, as explained below.

The rod has a central length or section for receiving the butterfly 16. The cross-section of this central length is of such a shape as to prevent the butterfly from rotating on the shaft. A particularly advantageous solution consists in giving the cross-section the shape of a circle having two parallel flats. If the flats are disposed parallel to the airflow direction when the butterfly is in its fully open position, the transverse size of the butterfly and consequently the head loss can be considerably reduced.

Figure 3:
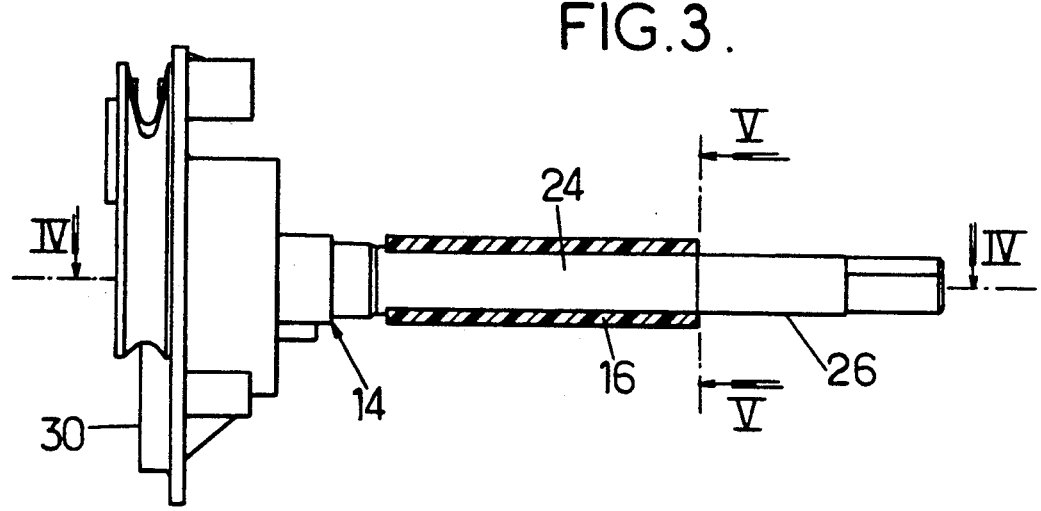
FIG. 3 (in which the butterfly is shown in closed position) is an elevation view of a rotary throttle member of the kind shown in FIG. 1.

The entire portion of the shaft situated on one side of the length 24 (the right-hand end portion in FIGS. 3 and 4) is smaller in cross-section than the length 24, so as to enable it to be engaged through the butterfly 16 without difficulty. More precisely, the cross-section of the terminal portion must fit entirely within the cross-section of length 24. In the embodiments shown in FIGS. 3 and 4, the right-hand terminal portion includes a cylindrical bearing surface 26 of a diameter corresponding to the width of the length 24 between its flats. The tip has a polygonal cross-section enabling it to non-rotatably connect it to the slider of the potentiometer.

The other end portion of the shaft (to the left in FIGS. 3 and 4) has a bearing surface 28 whose function is explained below and the cam 30 whose general shape may be similar to that described in the above-mentioned French patent application No. 91 05512. Holes formed in the plate of cam 30 serve to receive the ends of return springs 32 whose other ends are secured to the housing 10.

Figure 5:
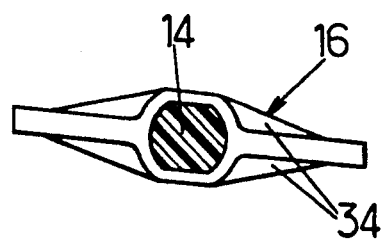
FIG. 5 shows the butterfly on its own, with the shaft shown in cross-section on line V—V of FIG. 3.

The butterfly 16 is in the form of a disk having a central hub formed with a hole that is complementary in shape to that of length 24. As shown in FIGS. 2 and 5, the central hub may be flat in shape, thereby reducing head loss if the flats of the length 24 extend substantially parallel to the flow direction in the fully open position. The disk of the butterfly may be reinforced by ribs 34.

As a general rule, anti-friction rings and/or ball bearings are interposed between the shaft 14 and the housing. In the embodiment shown in FIG. 1, a ring 36 placed in the housing receives the bearing surface 26. The bearing surface at the opposite end is mounted in a ball bearing 38. A simple assembling method consists in force-fitting the inner ring of the ball bearing onto the shaft until it is brought into abutment against the end shoulder of the length 24, then inserting the shaft, fitted with the ball bearing, into place, the outer ring of the ball bearing being provided with a claw washer for securing it in the plastic body.

The above description shows that the butterfly valve can be assembled very simply. The butterfly is inserted in the passage 12. The shaft, fitted with ball bearing 38, is engaged through the housing and the butterfly and the springs are secured. The butterfly is moved into its closure position so as to ensure that it is properly centered. It is placed on an anvil and then fixed in place by means of a double-headed sonotrode (tool delivering ultra-sound energy) applied to the ends of the hub thereof.

I claim:

1. A rotary throttle member for a fuel admission system of an internal combustion engine, said rotary throttle member comprising a shaft having a central length and end portions straddling said central length and comprising a butterfly valve member received on said central length, said shaft and butterfly valve member being single pieces of synthetic material, wherein
    said central length has a uniform non-circular cross-section that is greater than a cross-section of the end portion of the shaft which is situated on one side of the length and said shaft includes a cam for connection with and winding of a control cable, belonging to the other one of said end portions of said shaft, and
    said butterfly valve member has a central hole of complementary cross-section of said central length and is placed on and fixed to said central length.

2. Rotary throttle member according to claim 1, wherein said synthetic material is a thermoplastic material.

3. Rotary throttle member according to claim 1, wherein said central length has a cross-section which is circular but for two parallel flats and wherein said butterfly valve member has a hub of flattened shape formed with said central hole whose cross-section is circular with flats parallel to wings of said butterfly valve member.

4. Rotary throttle member according to claim 1, wherein said end portion which is formed with said cam has a diameter throughout its length which is greater than dimensions of said central length in all radial directions.

5. Rotary throttle member according to claim 1, wherein said butterfly member and shaft are mutually connected by ultrasonic welding.

6. Rotary throttle member according to claim 1, wherein said butterfly member and said shaft consist of thermoplastic material containing 30 to 40% by weight of filling.

7. A rotary throttle member for a fuel injection system of an internal combustion engine, said a rotary throttle member comprising:
    a shaft having a central length and end portions straddling said central length and two end portions each formed with a cylindrical bearing surface, straddling said central length, and
    a butterfly valve member secured onto said central length;
    said shaft and butterfly valve member each being a single molded piece of synthetic material, wherein
    said central length has a uniform cross-section which is circular with two mutually parallel flats and which is greater than a cross-section of the end portion of the shaft which is situated on one side of the length and said shaft includes a cam for connection with and winding of a control cable, belonging to the other one of said end portions of said shaft, and
    said butterfly valve member has a central hole of complementary cross-section of said central length, with flats parallel to wings of the butterfly valve.

8. A throttle body assembly for an internal combustion engine, having:
    a housing of synthetic material having an induction passage and two mutually aligned bores defining an axis transverse to said passage; and
    a rotary throttle member comprising a shaft having a central length and end portions straddling said central length and comprising a butterfly valve member received on said central length, said shaft and butterfly valve member being single pieces of synthetic material, wherein said central length has a uniform non-circular cross-section that is greater than a cross-section of one of the end portions of the shaft which is situated on one side of the length and said shaft includes a cam for connection with and winding of a control cable, belonging to the other one of the end portions of said shaft, wherein said butterfly valve member has a central hole of complementary cross-section of said central length and is placed on and fixed to said central length, and wherein means are provided between said bores and said end portions of said shaft for enabling rotary movement of said shaft.

* * * * *